Jan. 28, 1958     J. K. DOUGLAS     2,821,145
HYDROSTATICALLY BALANCED DRIVING CONNECTION
Filed Nov. 23, 1956     3 Sheets-Sheet 1

INVENTOR
JAMES K. DOUGLAS
ATTORNEY

Jan. 28, 1958     J. K. DOUGLAS     2,821,145
HYDROSTATICALLY BALANCED DRIVING CONNECTION

Filed Nov. 23, 1956     3 Sheets-Sheet 2

INVENTOR
JAMES K. DOUGLAS
ATTORNEY

Jan. 28, 1958     J. K. DOUGLAS     2,821,145
HYDROSTATICALLY BALANCED DRIVING CONNECTION
Filed Nov. 23, 1956     3 Sheets-Sheet 3
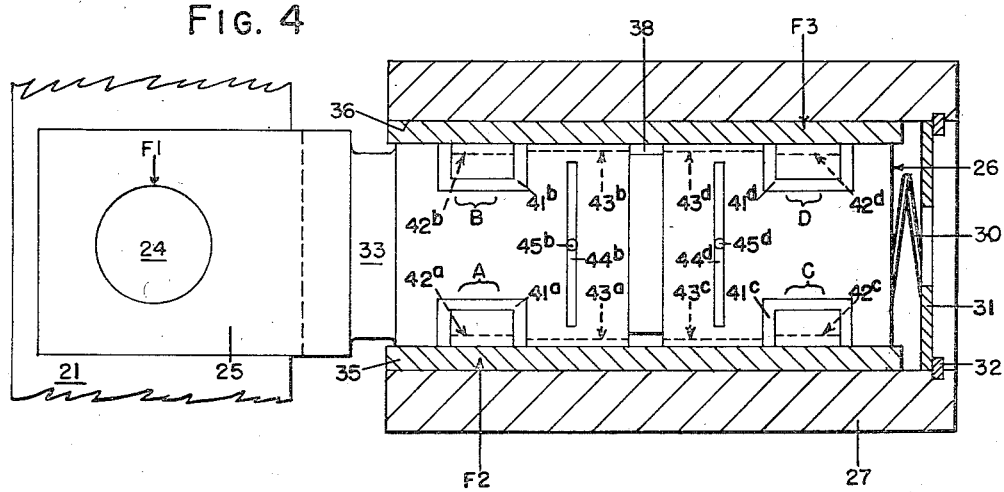
INVENTOR
JAMES K. DOUGLAS
BY: *Wesley S. Merrill*
ATTORNEY

United States Patent Office 2,821,145
Patented Jan. 28, 1958

2,821,145

HYDROSTATICALLY BALANCED DRIVING CONNECTION

James K. Douglas, Shorewood, Wis., assignor to The Oilgear Company, Milwaukee, Wis., a corporation of Wisconsin Application November 23, 1956, Serial No. 624,005

12 Claims. (Cl. 103—162)

This invention relates to driving connections of the type employed to transmit driving forces from one to the other of two members which are spaced from each other transversely of the direction of the driving force.

A driving connection constructed according to the invention is particularly adapted to transmit driving forces from one to the other of two members which have some relative movement between the points on the members from and to which the driving forces are transmitted.

For the purpose of illustration, the invention will be explained as being embodied in a driving connection for transmitting rotating forces between the cylinder barrel and the universal joint of a hydrodynamic machine, which will be referred to herein as a pump in order to simplify the description, but the invention is not limited to such use.

An object of the invention is to provide a driving connection which is hydrostatically balanced.

Another object is to provide a driving connection which is positively lubricated.

A driving connection constructed according to the invention has the advantage that it may readily be incorporated in existing machines.

Other objects and advantages will appear from the following description of the embodiments of the invention illustrated in the accompanying drawings in which the views are as follows:

Fig. 3 is a longitudinal sectional view taken on the line 3—3 of Fig. 2 through one of the pump cylinders and through one of the driving connections which transmits rotative forces between the cylinder barrel and the universal joint, the view being drawn to a larger scale than Fig. 2.

Fig. 4 is a longitudinal sectional view taken on the line 4—4 of Fig. 3.

Figs. 5 and 6 are transverse sectional views taken, respectively, on the lines 5—5 and 6—6 of Fig. 3.

Figure 1:
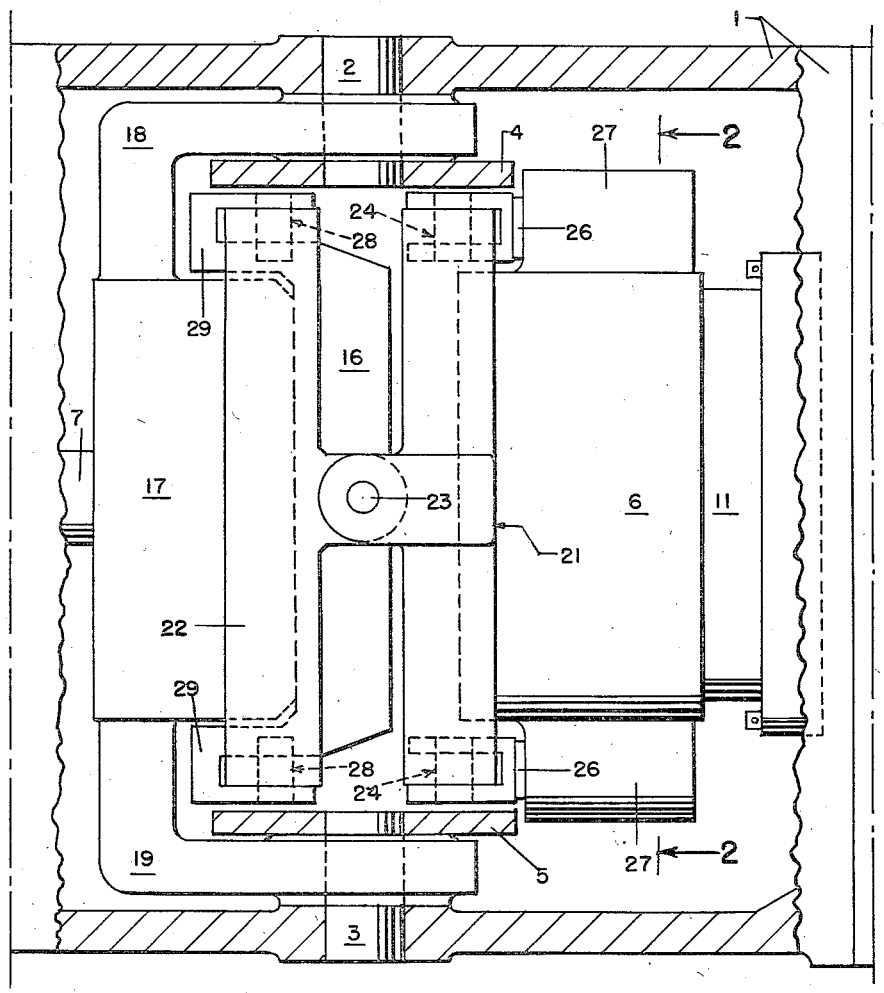
Fig. 1 is a side elevation of a pump having embodiments of the invention incorporated therein, the end portions of the pump being omitted and the pump casing being broken away to expose the cylinder barrel, universal joint and other parts of the pump.
Figure 2:
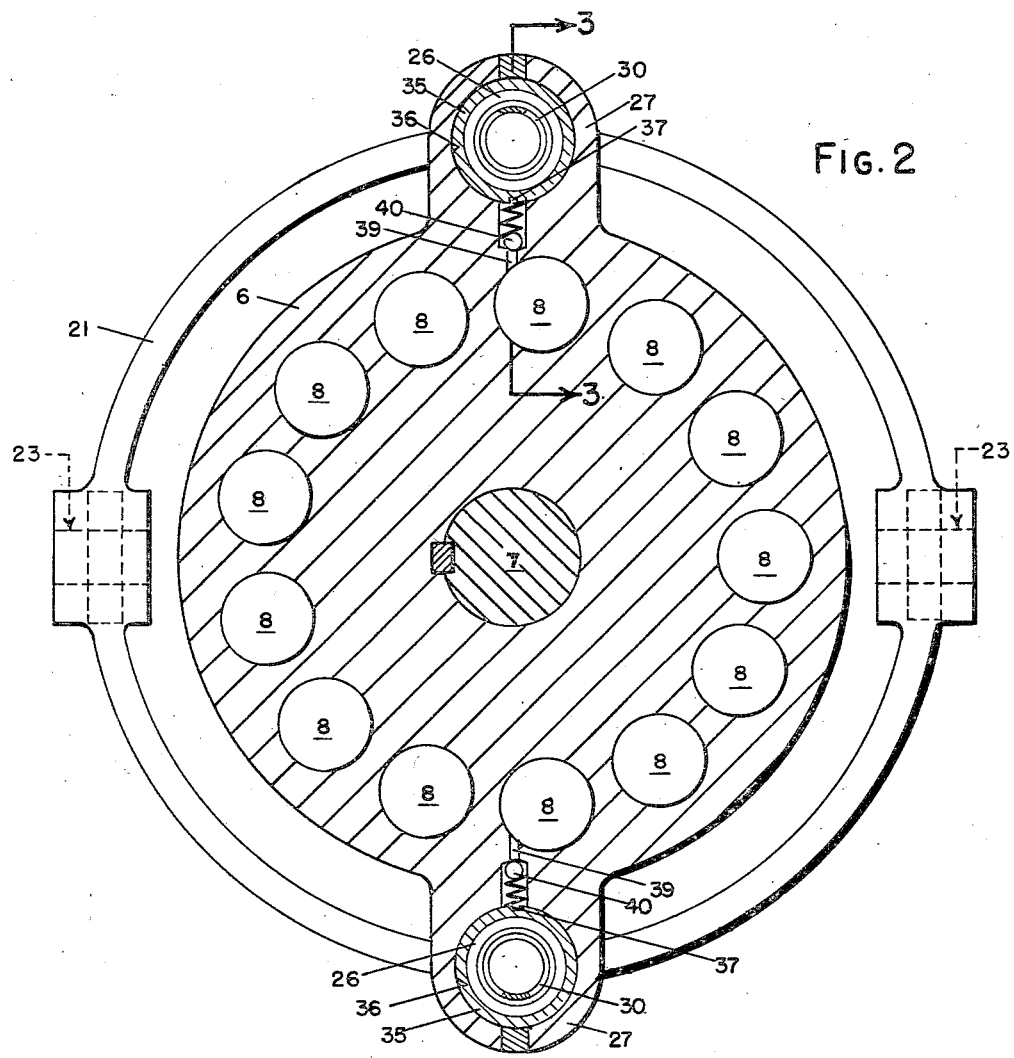
Fig. 2 is a transverse sectional view taken through the cylinder barrel on the line 2—2 of Fig. 1 and also showing the universal joint which is driven by the cylinder barrel, the view being drawn to a larger scale than Fig. 1.
Figure 7:
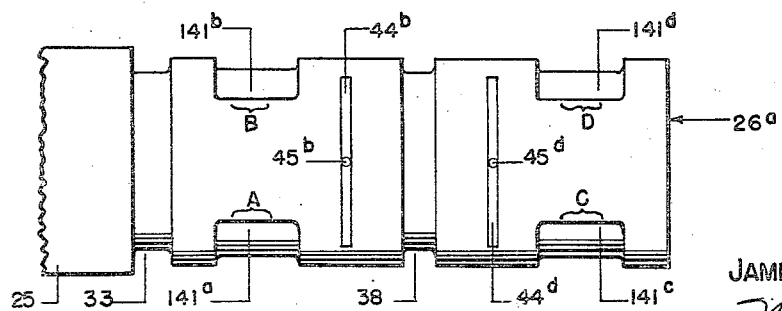

Fig. 7 is a view illustrating a modification of the driving element shown in Figs. 3 and 4.

For the purpose of illustration, the invention has been shown in Figs. 1–6 as being incorporated in a pump of which only so much has been shown as is necessary to an explanation of the invention as the pump illustrated is substantially the same as one-half or one unit of the two unit or duplex pump shown in application Serial No. 545,242, filed November 7, 1955, to which reference may be had for details of construction.

As shown, the pump has its mechanism arranged within and carried by a casing 1 having two trunnions 2 and 3 carried by its top and bottom walls, respectively. The inner ends of trunnions 2 and 3 are supported, respectively, in webs 4 and 5 which are formed integral with casing 1.

The pump mechanism includes a rotatable cylinder barrel 6 fixed upon and supported by a drive shaft 7 which is journaled in casing 1. Cylinder barrel 6 has a plurality of cylinders 8 formed therein parallel to shaft 7, a piston 9 (Fig. 3) fitted in each cylinder and a cylinder port 10 extending from each cylinder 8 through the end of cylinder barrel 6. Flow of liquid to and from cylinders 8 is controlled by a flat valve 11 which is carried by casing 1 and engages the end of cylinder barrel 6. Valve 11 is of a well-known type having formed in the face thereof in contact with the cylinder barrel two arcuate valve ports with which each port 10 communicates alternately during rotation of cylinder barrel 6. The valve ports have not been illustrated but one of them appears in Fig. 3 and is designated by the reference numeral 12.

Reciprocation of pistons 9 during rotation of cylinder barrel 6 is effected by a swash plate 16 which is rotatably supported upon a reaction member or cradle 17 having two arms 18 and 19 which are journaled upon trunnions 2 and 3 respectively. Each piston 9 is connected to swash plate 16 by a piston rod 20 (Fig. 3) having a ball and socket connection with piston 9 and a ball and socket connection (not shown) with swash plate 16. Piston rods 20 do not appear in Fig. 1 as they are substantially concealed by the universal joint to be presently described.

The arrangement is such that, when cylinder barrel 6 and swash plate 16 are rotated and cradle 17 is tilted upon trunnions 2 and 3 so that swash plate 16 is inclined to the axis of cylinder barrel 6, the pistons 9 on one side of the centerline of the pump will be progressively retracted and will draw liquid into their cylinders through valve 11 and the pistons 9 on the other side of the centerline of the pump will be progressively advanced and will discharge liquid from their cylinders through valve 11.

Swash plate 16 is driven in unison with cylinder barrel 6 through a universal joint comprising a ring 21 which extends around cylinder barrel 6 and a ring 22 which extends around swash plate 16. Rings 21 and 22 are pivotally connected to each other at diametrically opposed points by two pins 23. Ring 21 is pivotally connected by means of two pins 24 to the bifurcated outer end portions 25 of two driving elements 26 which are spaced 90° from pins 23 and are fitted, respectively, in two projections 27 formed integral with cylinder barrel 6. Ring 22 is pivotally connected by means of two pins 28 to the bifurcated ends of two arms 29 which are formed integral with swash plate 16 and are axially aligned, respectively, with the two driving elements 26.

The arrangement is such that, when cradle 17 is tilted upon trunnions 2 and 3 to incline the face of swash plate 16 to the pump axis and cylinder barrel 6 is rotated by shaft 7, cylinder barrel 6 will rotate ring 21 through elements 26 and pins 24, ring 21 will rotate ring 22 through pins 23, and ring 22 will rotate swash plate 16 through pins 28 and arms 29, and swash plate 16 will reciprocate pistons 9 through rods 20.

Means preferably are provided to take up any lost motion which might be in the connections of the universal joint. For example, each driving element 26 may be hollow and a spring 30 arranged therein with its outer end in contact with a retaining disc 31 which is arranged within a projection 27 and is retained in position by a snap ring 32. The pump as thus far described is fundamentally the same as the pump illustrated and described in application Serial No. 545,242.

During operation of the pump as described above, driving elements 26 will have slight axial movements relative to cylinder barrel 6 due to ring 22 rotating in a plane which is inclined to the plane in which ring 21 rotates. In order to prevent undue wear and to prevent driving elements 26 from sticking in their cylinders, elements 26 are positively lubricated and are substantially hydrostatically balanced.

Except for its bifurcated outer portion 25, each driving element 26 is cylindrical and is provided with a cannelure 33 adjacent to its bifurcated portion 25. Each element 26 may have its cylindrical portion slideably fitted in a suitable bore formed in a projection 27 but, in order that the element may be readily supplied with liquid under pressure, each element 26 is slideably fitted in a sleeve 35 which is closely fitted in a bore 36 formed in a projection 27.

Sleeve 35 has formed in its outer peripheral surface a passage 37 one end of which extends through the wall of sleeve 35 into communication with a cannelure 38 which is formed in element 26. The other end of passage 37 communicates with one of cylinders 8 through a passage 39 having arranged therein a check valve 40 which permits liquid to flow from cylinder 8 into cannelure 38 but prevents escape of liquid from cannelure 38 through passage 37. The arrangement is such that, when pressure is created in the cylinder 8 to which channel 39 is connected, the same pressure will prevail in cannelure 38.

Each driving element 26 has formed in its peripheral surface at one side of cannelure 38 two diametrically opposed rectangular pressure grooves $41^a$ and $41^b$ and two axial pressure grooves $42^a$ and $42^b$ which interconnect opposite sides of grooves $41^a$ and $41^b$ respectively. Each element 26 also has formed in its peripheral surface at the other side of cannelure 38 two diametrically opposed rectangular pressure grooves $41^c$ and $41^d$ and two axial pressure grooves $42^c$ and $42^d$ which interconnect opposite sides of grooves $41^c$ and $41^d$ respectively. Grooves $41^a$, $41^b$, $41^c$ and $41^d$ are connected, respectively, to cannelure 38 by shallow grooves $43^a$, $43^b$, $43^c$ and $43^d$ which are formed in the surface of element 26 to permit liquid to flow therethrough from cannelure 38 into the several grooves 41 and 42 and create pressure therein. The several grooves 43 preferably are V-shaped in cross-section and are such size as to considerably restrict the rate of flow therethrough.

A lubricating film is formed between the mating surfaces of element 26 and sleeve 35 by liquid which seeps from the pressure grooves whenever there is pressure in the grooves, and pressure extends from the grooves into the film. In order to limit the area of film into which pressure can extend, two diametrically opposed drain grooves $44^a$ and $44^b$ are formed in the peripheral surface of element 26 at one side of cannelure 38 and two diametrically opposed drain grooves $44^c$ and $44^d$ are formed in the peripheral surface of element 26 at the other side of cannelure 38. Grooves $44^b$ and $44^d$ are connected, respectively, by holes $45^b$ and $45^d$ to the hollow interior of element 26 from which liquid can readily escape into the interior of the pump casing. Drain grooves $44^a$ and $44^c$ are similarly connected to the interior of element 26 by holes not shown.

The area bounded by the outer edges of each rectangular groove 41 constitutes a high pressure area because the pressure in the film within the inner edges of the groove 41 is the same as the pressure in the groove. The area surrounding each rectangular groove constitutes a low pressure area because the pressure in the film in that area is the same as the pressure in the groove 41 at the outer edges of that groove and gradually drops to zero at the edges of the adjacent drain grooves 44 and at the edge of cannelure 33 or at the inner end of element 26 as the case may be. The pressure areas defined by grooves $41^a$, $41^b$, $41^c$ and $41^d$ have been designated in Fig. 4 as pressure areas A, B, C and D respectively.

The pressure in each of the four grooves 41 causes the film of liquid surrounding that groove to flow axially inward into the adjacent drain grooves 44 and axially outward to exhaust past the edge of cannelure 33 or past the inner end of element 26 as the case may be. The clearance between element 26 and sleeve 35 is so small that the film flows at a very limited rate. Grooves 43 are of such size that they cause a drop in pressure between cannelure 38 and each of grooves 41 but supply liquid to each groove 41 as fast as liquid can escape therefrom at the pressure prevailing in that groove 41.

When the pump is adjusted to pump liquid and cylinder barrel 6 is rotated, ring 21 of the universal joint will exert upon the outer end of element 26 a force F1 (Fig. 4) which is counter to the direction of rotation. The magnitude of force F1 is determined by the pressure created by the pump and by the stroke of pistons 9. If there were no pressure in the several pressure areas on element 26 during operation of the pump at high pressure, force F1 would cause element 26 to tilt upon the edge of cannelure 33 and squeeze out the lubricating film from a spot on one side of element 26 adjacent to cannelure 33 and from a spot on the other side of element 26 adjacent to its inner end. Then the slight axial movements made by element 26 during rotation of cylinder barrel 6 would cause abrasion of the metal in the unlubricated spots and eventual seizure of element 26 and sleeve 35. But with pressure in the four pressure areas, element 26 is held out of metal-to-metal contact with sleeve 35.

When the pump is discharging liquid and creating pressure therein, a driving force F2 is transmitted from cylinder barrel 6 to element 26 and the center of that force is at or near the center of pressure area A. Force F2 is opposed by force F1 and by a force F3 which is equal to the difference between force F2 and force F1 and which has its center at or near the center of pressure area D.

Forces F2 and F3 will slightly reduce the clearance between the inner wall of sleeve 35 and pressure areas A and D, thereby momentarily reducing the rates at which liquid can escape from pressure grooves $41^a$ and $41^d$. The reductions in clearance are so slight that the effect thereof on the capacities of grooves $43^a$ and $43^d$ is negligible. Consequently, liquid will continue to flow through grooves $43^a$ and $43^d$ at substantially the same rate and will almost instantly increase the pressures in pressure areas A and D until they are high enough to cause liquid to escape from grooves $41^a$ and $41^d$ just as fast as but no faster than liquid is supplied thereto through grooves $43^a$ and $43^d$.

Decreasing the clearances between sleeve 35 and pressure areas A and D causes corresponding increases in the clearances between sleeve 35 and pressure areas B and C. Increasing the clearances causes the rate at which liquid escapes from pressure grooves $41^b$ and $41^c$ to increase momentarily until the pressure therein is reduced by such values as to cause liquid to escape from grooves $41^b$ and $41^c$ no faster than but just as fast as liquid is supplied thereto through grooves $43^b$ and $43^c$.

During one-half of each revolution of cylinder barrel 6, the cylinder 8 to which channel 39 is connected will contain liquid under pressure which will cause pressure to be maintained in the pressure areas on element 26, as explained above, but there is no pressure in that cylinder 8 during the other half of each revolution of cylinder barrel 6. The pump ordinarily is driven at a conventional speed such as 1200 R. P. M. at which speed the pressure in the cylinder 8 to which channel 39 is connected will alternate between a high pressure and a negative or zero pressure every 1/40 second. The instant that the pressure in that cylinder drops, check valve 40 will close and will trap in cannelure 38 a body of liquid under high pressure.

During each interval when no high pressure liquid is being supplied to cannelure 38, liquid will continue to escape from the pressure grooves 41 which will drop the pressure therein and permit the body of high pressure liquid in cannelure 38 to expand and liquid to flow therefrom into grooves 41. Since the interval is so brief and since the rate of escape of liquid from grooves 41 decreases as the pressure therein decreases a substantial pressure remains in each of the high pressure areas on element 26 until pressure is again created in cannelure 38 and instantly restores the pressures in the high pressure areas to normal.

Driving element 26 is thus positively lubricated at all times, is hydrostatically balanced against the driving forces during one-half of each revolution of cylinder barrel 6, it is partially hydrostatically balanced during the other half of each revolution of cylinder barrel 6 and, when two driving elements are provided in a pump as shown, each element is hydrostatically balanced when the other element is partially balanced.

In a particular size pump of the type shown, each of the driving elements 26 is about 1¼" in diameter, the clearance between element 26 and sleeve 35 is about .0004" and feed grooves 43 are V-shaped in cross-section and about .0085" deep. The capacity of each groove 43 is such that, if a pressure of 5000 p. s. i. prevails in cannelure 38 and no rotating force was being transmitted through element 26, liquid could flow through each groove 43 fast enough to maintain in each groove 41 a pressure of 2500 p. s. i. at which pressure liquid would escape from groove 41 as fast as it was supplied thereto through groove 43.

When the pump is operating at full stroke and at 5000 p. s. i., a force of about 1175 lbs. on each of the pins 24 is required to rotate universal joint 21—22 and swash plate 16. With the center of force F2 midway between the centers of forces F1 and F3 as shown, force F3 will be about 1175 lbs. and force F2 will be about 2350 lbs.

Force F2 will reduce the clearance between sleeve 35 and pressure area A about .0001 or about 25% and thereby momentarily reduce the rate at which liquid can escape from groove 41ª. But the reduction in clearance has so little effect upon the flow capacity of groove 43ª that liquid will continue to flow therethrough at approximately the same rate and will raise the pressure in groove 41a until it is high enough, such as 4000 p. s. i., to cause liquid to escape from groove 41ª as fast as liquid is supplied thereto through groove 43ª.

Decreasing the clearance between pressure area A and sleeve 35 causes a corresponding increase in the clearance between pressure area B and sleeve 35. Increasing the clearance causes the pressure in pressure area B to drop to such a value, such as 1000 p. s. i., that liquid can escape from groove 41ᵇ as fast as liquid is supplied thereto through groove 43ᵇ.

The clearance between pressure area D and sleeve 35 will be increased and the clearance between sleeve 35 and pressure area C will be decreased by force F3 and thereby cause the pressure in pressure area D to be increased and the pressure in pressure area C to be decreased in the same way that the pressure in pressure area A is increased and the pressure in pressure area B is decreased but the variations in the pressures in pressure areas D and C would not be as great as the variations in the pressures in pressure areas A and B because force F3 is smaller than force F2.

*Fig. 7*

The driving element 26ª shown in this figure differs from element 26 in that the metal bounded by rectangular pressure grooves 41 is removed to the same depth as the grooves to form recesses 141ª, 141ᵇ, 141ᶜ, and 141ᵈ which define pressure areas A, B, C, and D respectively. Since the element 26ª is otherwise identical to element 26 and functions in the same manner, like parts have been indicated by like reference numerals and further description is deemed unnecessary.

The driving connection illustrated and described herein may be modified in various ways and adapted to various uses without departing from the scope of the invention which is hereby claimed as follows:

1. A driving connection for transmitting forces from a rotatable driving member to a rotatable driven member one of which has a bore and a chamber containing liquid under pressure, said driving connection comprising a cylindrical driving element which is fitted in said bore and has a slight clearance between its periphery and the wall of said bore, means connecting said element to the other of said members, a pair of diametrically opposed pressure areas arranged upon said element adjacent to each end of said bore, the extent of each of said areas being determined by removing metal from the peripheral surface of said element, channel means connecting said bore to said chamber, and a restricted passage connecting each of said pressure areas to said channel means, each of said passages being of such a size that liquid tends to flow therethrough into a pressure area faster than liquid can escape therefrom and thereby causes pressure to be created in that area but the resistance of said passage is sufficient to cause a substantial drop in pressure between said channel means and that area.

2. A driving connection according to claim 1 in which each of said pressure areas includes a substantially rectangular pressure groove which is formed in the peripheral surface of said element and each of said restricted passages is a V-shaped groove which is formed in the peripheral surface of said element and communicates with one of said pressure grooves.

3. A driving connection according to claim 1 in which said element has a pair of diametrically opposed substantially rectangular pressure grooves formed in its peripheral surface adjacent to each end of said bore, a pair of diametrically opposed pressure limiting grooves formed in its peripheral surface axially inward from each of said pairs of pressure grooves, and a cannelure which is formed in its peripheral surface intermediate said pressure limiting grooves and forms a part of said pressure channel means, and in which said restricted passages are shallow V-shaped grooves which are formed in the peripheral surface of said element and connect said pressure grooves to said cannelure.

4. A driving connection for transmitting forces from a rotatable driving member to a rotatable driven member one of which has a bore and a chamber containing liquid under pressure, said driving connection comprising a sleeve closely fitted in said bore, a cylindrical driving element which is fitted in said sleeve and has a slight clearance between its periphery and the wall of said sleeve, means connecting said element to the other of said members, a pair of diametrically opposed pressure areas arranged upon said element adjacent to each end of said sleeve and each including a high pressure area formed by removing metal from the peripheral surface of said element, channel means connecting the interior of said sleeve to said chamber and including a channel which extends radially through the wall of said sleeve and then extends axially in the outer peripheral surface of said sleeve, and a restricted passage connecting each of said pressure areas to said channel, each of said passages being of such a size that liquid tends to flow therethrough into a high pressure area faster than liquid can escape therefrom and thereby causes pressure to be created in that area but the resistance of said passage is sufficient to cause a substantial drop in pressure between said channel means and that area.

5. A driving connection according to claim 4 in which said restricted passages are formed in the peripheral surface of said element and are V-shaped in cross-section.

6. A driving connection according to claim 4 in which said element has a pair of diametrically opposed pressure limiting grooves formed in its peripheral surface axially inward from each of said pairs of high pressure areas and a cannelure formed in its peripheral surface between said pairs of grooves and in communication with said channel, and in which said restricted passages are shallow V-shaped grooves which are formed in the peripheral surface of said element and connect said high pressure areas to said cannelure.

7. A driving connection for use in a hydrodynamic machine having a universal joint and a rotatable cylinder barrel provided with a bore and with cylinders each of which contains liquid and has high pressure created therein during one-half of each revolution of said cylinder barrel and has little or no pressure therein during the other half of each revolution of said cylinder barrel, said driving connection comprising a cylindrical driving element and a closely surrounding sleeve which is fitted in said bore and has a slight clearance between its periphery and the wall of said bore, means connecting said element to said joint, a pair of diametrically opposed pressure areas arranged upon said element adjacent to each end of said sleeve and each including a high pressure area formed by removing metal from the peripheral surface of said element, channel means connecting said bore to one of said cylinders, a restricted passage connecting each of said pressure areas to said channel means, each of said passages being of such a size that during each time said cylinder contains liquid under high pressure liquid tends to flow therethrough into a high pressure area faster than liquid can escape therefrom and thereby causes pressure to be created in that area but the resistance of said passage is sufficient to cause a substantial drop in pressure between said channel means and that area, and a check valve arranged in said channel means to prevent flow of liquid from said pressure areas into said cylinder during each time said cylinder contains little or no pressure.

8. A driving connection according to claim 7 in which each of said pressure areas includes a substantially rectangular pressure groove which is formed in the peripheral surface of said element and each of said restricted passages is a V-shaped groove which is formed in the peripheral surface of said element and communicates with one of said pressure grooves.

9. A driving connection according to claim 7 in which said element has a pair of diametrically opposed substantially rectangular pressure grooves formed in its peripheral surface adjacent to each end of said bore, a pair of diametrically opposed pressure limiting grooves formed in its peripheral surface axially inward from each of said pairs of pressure grooves, and a cannelure which is formed in its peripheral surface intermediate said pressure limiting grooves and forms a part of said pressure channel means, and in which said restricted passages are shallow V-shaped grooves which are formed in the peripheral surface of said element and connect said pressure grooves to said cannelure.

10. A driving connection for use in a hydrodynamic machine having a universal joint and a rotatable cylinder barrel provided with a bore and with cylinders each of which contains liquid and has high pressure created therein during one-half of each revolution of said cylinder barrel and has little or no pressure therein during the other half of each revolution of said cylinder barrel, said driving connection comprising a sleeve closely fitted in said bore, a cylindrical driving element which is fitted in said sleeve and has a slight clearance between its periphery and the wall of said sleeve, means connecting said element to said joint, a pair of diametrically opposed pressure areas arranged upon said element adjacent to each end of said sleeve and each including a high pressure area formed by removing metal from the peripheral surface of said element, channel means connecting the interior of said sleeve to one of said cylinders and including a channel which extends radially through the wall of said sleeve and then extends axially in the outer peripheral surface of said sleeve, a restricted passage connecting each of said pressure areas to said channel, each of said passages being of such a size that during each time said cylinder contains liquid under high pressure liquid tends to flow therethrough into a high pressure area faster than liquid can escape therefrom and thereby causes pressure to be created in that area but the resistance of said passage is sufficient to cause a substantial drop in pressure between said channel means and that area, and a check valve arranged in said channel means to prevent flow of liquid from said pressure areas into said cylinder during each time said cylinder contains little or no pressure.

11. A driving connection according to claim 10 in which said restricted passages are formed in the peripheral surface of said element and are V-shaped in cross-section.

12. A driving connection according to claim 10 in which said element has a pair of diametrically opposed pressure limiting grooves formed in its peripheral surface axially inward from each of said pairs of high pressure areas and a cannelure formed in its peripheral surface between said pairs of grooves and in communication with said channel, and in which said restricted passages are shallow V-shaped grooves which are formed in the peripheral surface of said element and connect said high pressure areas to said cannelure.

No references cited.